United States Patent [19]
Hata

[11] Patent Number: 4,992,720
[45] Date of Patent: Feb. 12, 1991

[54] CHARGE CONTROL CIRCUIT FOR CORDLESS TELEPHONE SYSTEM

[75] Inventor: Mamoru Hata, Tokyo, Japan

[73] Assignee: NEC Corporation, Tokyo, Japan

[21] Appl. No.: 302,892

[22] Filed: Jan. 30, 1989

[30] Foreign Application Priority Data

Jan. 29, 1988 [JP] Japan ................................. 63-16952

[51] Int. Cl.⁵ ........................... H02J 7/00; H04Q 7/04
[52] U.S. Cl. ....................................... 320/23; 320/31; 320/37; 379/61
[58] Field of Search ....................... 320/21, 20, 39, 40, 320/23, 37, 38, 31, 32; 379/61

[56] References Cited

U.S. PATENT DOCUMENTS

| | | | |
|---|---|---|---|
| 3,886,427 | 5/1975 | Long | 320/37 X |
| 4,097,792 | 6/1978 | Calaway | 320/37 X |
| 4,668,901 | 5/1987 | Furukawa | 320/21 X |
| 4,746,854 | 5/1988 | Baker et al. | 320/37 X |
| 4,939,770 | 7/1990 | Makino | 379/61 |

Primary Examiner—R. J. Hickey
Attorney, Agent, or Firm—Sughrue, Mion, Zinn, Macpeak & Seas

[57] ABSTRACT

A charge control circuit is used for a cordless telephone system which includes a base unit having a quick charger and a trickling charger and a handset containing a battery. The charge control circuit comprises a connection detector, a full-charged condition detector, a timer and a controller. The connection detector detects the connection of the handset to the base unit to start the charging operation for the battery. The full-charged condition detector detects the full-charged condition of the battery. The timer has a predetermined period of time and starts it counting operation after the full-charged condition detector detects the full-charged condition of the battery. The controller controls the battery to be quickly charged with the quick charger after the timer counts up the predetermined period of time. On the other hand, the controller controls the battery to be tricklingly charged with the trickling charger until the timer counts up the predetermined period of time, so that the battery is prevented from being over-charged.

10 Claims, 5 Drawing Sheets

FIG.6

# CHARGE CONTROL CIRCUIT FOR CORDLESS TELEPHONE SYSTEM

BACKGROUND OF THE INVENTION

The present invention relates to a charge control circuit for a cordless telephone system including a portable unit (handset) and a base unit and more particularly to a charge control circuit which controls charge operation for a battery contained in the handset.

In a conventional cordless telephone system, a battery contained in a handset is electrically charged when the handset is set to a base unit, and charge control is conventionally carried out such that the battery is not electrically short-charged and is not over-charged. In detail, when the handset is set back to the base unit, the battery in the handset is quickly charged by a charger in the base unit and, after detection of voltage drop ($\Delta V$) caused due to the fully charged condition, trickling charge is started or charge is inhibited.

Figure 1:
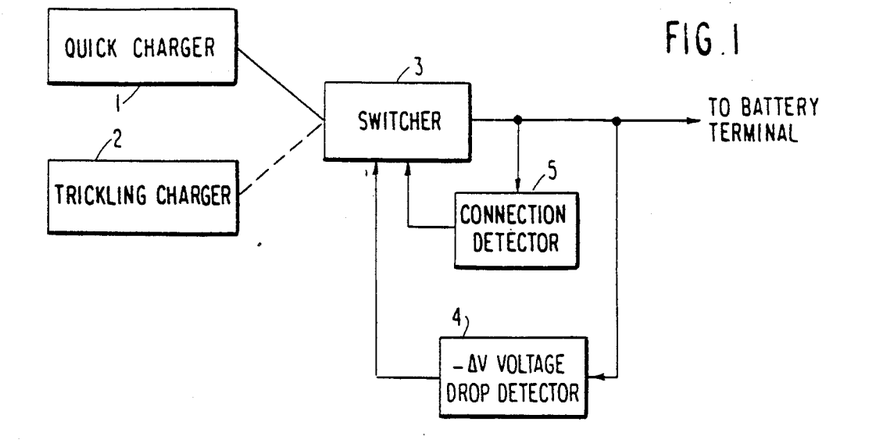
FIG. 1 is a block diagram which schematically illustrates a conventional charge control circuit.

Further details of a conventional charge control of this type will be described in conjunction with FIG. 1 which illustrates only portions related to charge control in the base unit of the cordless telephone system. The conventional charge control arrangement of FIG. 1 comprises a quick charger 1, a trickling charger 2, switcher 3, a voltage drop ($-\Delta V$) detector 4, and a connection detector 5. Generally, a chargeable battery, for example, a Ni-Cd battery has a characteristic that an output voltage drops by a certain value $\Delta V$ when it is fully charged. Therefore, it is possible to find the fully-charged condition by detecting the voltage drop $\Delta V$.

Further, it is assumed that a battery is contained in a handset (not shown in FIG. 1) and has a capacity of 600 mAH when fully charged. The battery is charged by the quick charger 1 when the handset is set to the base unit and, in this case, a charging current is as great as 600 mA. When a voltage drop ($-\Delta V$) is detected by the voltage drop detector 4, the trickling charger 2 is selected for trickling charge by the switcher 3. Further, when the handset is being used for speech communication, the battery is discharged at a rate of 60 mA/H.

Let it now be assumed that the battery in the handset is fully charged and the handset is used for one minute to make speech communication. When the handset is returned back to the base unit, the battery is quickly charged by the quick charger 1 via the switcher 3, and the voltage drop $-\Delta V$ is detected after five minutes. In this case, the time of about five minutes is usually required to detect the voltage drop even when the battery is fully charged. This is because the rechargeable Nickel Cadmium battery has a characteristic that the voltage drop $\Delta V$ occurs only after a certain period of time (about 5 minutes) from the full charge.

When the forementioned charge control is repeated, the battery is discharged by 1 mAH (60 mA×(1/60)) for each usage of the handset and is then charged by 50 mAH (600 mA×(5/60)) after each usage of the handset. Accordingly, the battery is charged by 49 mAH for each usage of the handset. In this case, after the $-\Delta V$ detection, the trickling charge is continued in practice. However, the charging current in the trickling charge is so small as to compensate only for a self-discharge of the battery, and is neglected here.

Therefore, if the above charging operation is repeated several times, a charging current is added to the fully charged battery within a short period of time, that apparently means over-charging.

As described above, when the handset is used for a short period of time, the discharge and charge are repeated, and the battery is subject to over-charge even if $-\Delta V$ is properly detected and the aforementioned charge control is properly completed. Therefore, the life of the battery is disadvantageously shortened, and the charger and the battery undesirably generate heat.

SUMMARY OF THE INVENTION

It is therefore an object of the present invention to provide a charge control circuit for a cordless telephone system which is capable of preventing over-charge of a battery contained in a handset of the system.

It is another object of the present invention to provide a charge control circuit for a cordless telephone system which is capable of lengthening the life of a battery contained in a handset of the system.

According to the present invention, there is provided a charge control circuit for a cordless telephone system including a base unit and a handset containing a battery, the charge control circuit comprising: a connection detector for detecting a connection of the handset to the base unit, a full-charged condition detector for detecting a full-charged condition of the battery, a timer for establishing a predetermined time period after the full-charged condition detection, and a controller for controlling a charge operation for the battery, wherein the battery is charged with a quick charge mode after the predetermined time period elapses and the battery is charged with a trickling charge mode or with a charge inhibition mode during the predetermined time period.

DESCRIPTION OF THE PREFERRED EMBODIMENTS

The invention will now be described in conjunction with the drawings.

Figure 2A:
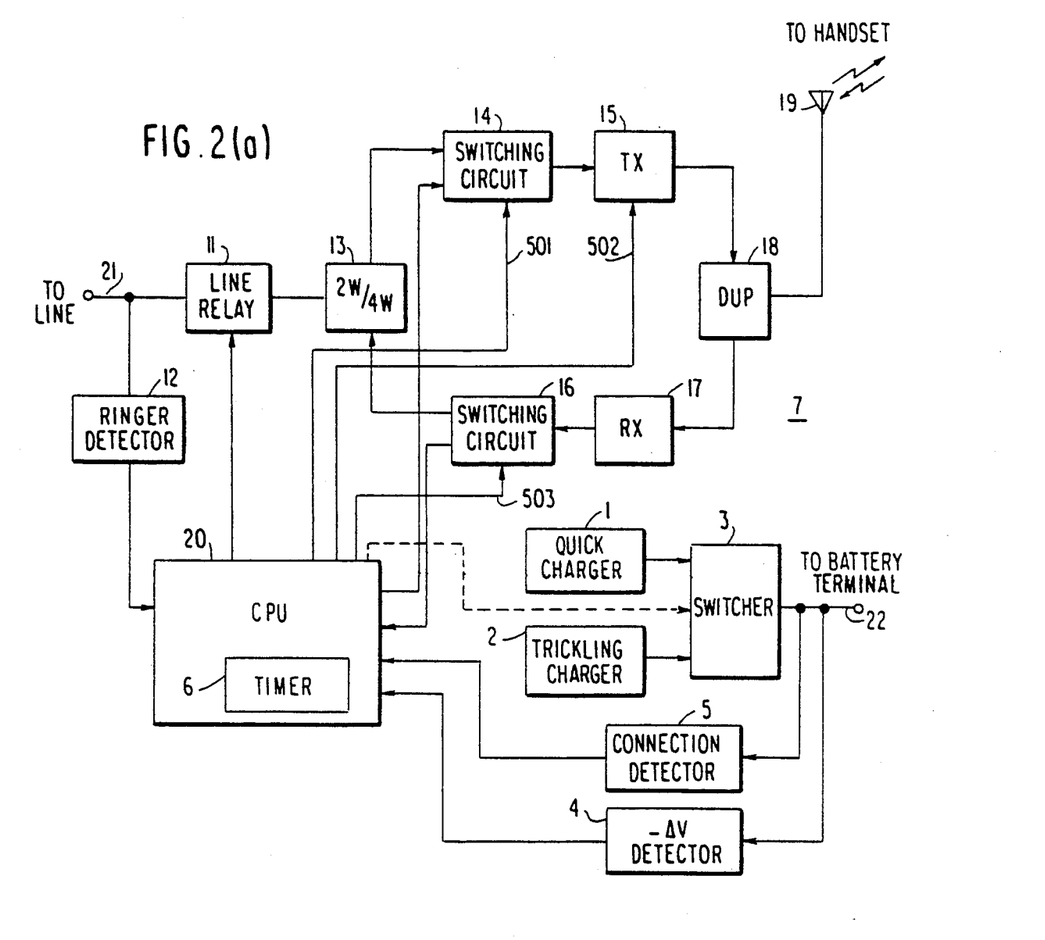
FIGS. 2(a) and 2(b) are block diagrams of a base unit and a handset illustrating an embodiment according to the present invention.
Figure 2B:
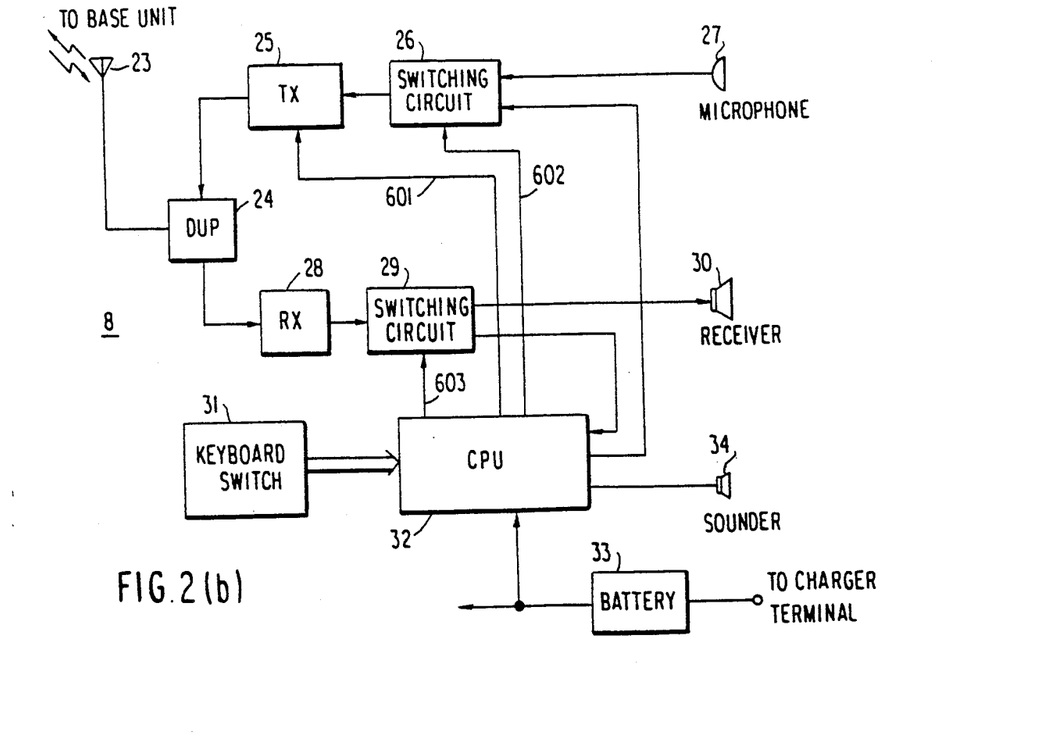

FIGS. 2(a) and 2(b) are block diagrams respectively showing a base unit 7 and a portable unit (handset) 8 of an embodiment of the present invention. In FIG. 2(a), the base unit 7 includes a quick charger 1, a trickling charger 2, and a switcher 3 which selects one of the outputs of the quick charger 1 and the trickling charger 2. A $-\Delta V$ detector 4 detects $-\Delta V$ to detect full-charge of the battery 33 (contained in the handset 8 of FIG. 2(b)) and sends a voltage drop detection signal to a CPU 20. A connection detector 5 detects that the battery 33 to be electrically charged is connected through a battery terminal 22 to the charger, i.e., the handset 8 is set to the base unit 7 and sends a connecting detection signal to the CPU 20. A timer 6 is substantially contained in the CPU 20 and is connected to the voltage drop detector 4. The timer circuit 6 initiates its time-counting operation in response to the voltage drop detection signal and supervises a time elapse after the $-\Delta V$ detection. If the time elapse is within a predetermined time set in the timer 6, the CPU 20 causes the switcher 3 to select the trickling charge even when the connecting detection signal is supplied from the connection detector 5 to the CPU 20.

First, operation of a cordless telephone system will now be described in conjunction with FIGS. 2(a) and 2(b). In FIG. 2(b), to make a speech communication using the cordless telephone system, a user of the handset 8 depresses a calling button of a keyboard switch 31. Then, a calling signal from a CPU 32 is supplied through a switching circuit 26 to a transmitter (TX) 25, where the calling signal is modified and transmitted through an antenna 23 and a duplexer (DUP) 24. At this moment, a CPU control signal 602 controls the switching circuit 26 to switch a signal line from a microphone 27 to the CPU 32, and another CPU control signal 601 controls the transmitter 25 to transmit a signal from the CPU 32.

In FIG. 2(a), the radio signal transmitted from the handset 8 is demodulated into the original calling signal by a receiver (RX) 17 passing through an antenna 19 and a duplexer (DUP) 18 of the base unit 7, and is supplied to the CPU 20 through a switching circuit 16. To this end, a control signal 503 is sent from the CPU 20 to the switching circuit 16.

The CPU 20 which has received the calling signal produces control signals 501 and 502 to control the switching circuit 14 to select a response signal from CPU 20 and to control the transmitter 15 to transmit it, respectively. In this case, the response signal from the CPU 20 is modified by the transmitter 15 and the radio signal of the response signal is sent to the handset 8 (FIG. 2(b)) from the antenna 19 through the duplexer 18.

In FIG. 2(b), the radio signal sent from the base unit 7 is demodulated into the original response signal by the receiver (RX) 28 through the antenna 23 and the duplexer 24 in the handset 8, and is supplied to the CPU 32 through a switching circuit 29. To this end, the control signal 603 is sent from the CPU 32 to the switching circuit 29.

The CPU 32 of the handset 8 which has received the response signal from the base unit 7 sends a dial signal to the base unit 7 through the transmitter TX 25, the dial signal corresponding to a dial key set by the keyboard switch 31. The CPU 20 of the base unit 7 which has received the dial signal from the handset 8 through the receiver 17 controls a line relay 11 in response to the dial signal, so that corresponding dial pulses are sent to telephone exchange equipment (not shown) via a TEL line 21.

The CPU 32 of the handset 8 which has sent the dial signal switches the switching circuits 26 and 29 to the side of the microphone 27 and to the side of the receiver 30, respectively, and assumes a communication waiting condition.

The CPU 20 of the base unit 7 which has sent the dial pulse controls the switching circuits 14 and 16 to connect with a two-wire/four-wire switching circuit (2W/4W) 13 and turns the line relay 11 on. Accordingly, the communication condition relative to a telephone set at the other end of the line is prepared.

To make a call to the cordless telephone system from the telephone set at the other end of the line, a low-frequency signal of a high voltage is sent from the exchange equipment to the TEL line 21. The signal is detected by a ringer detector 12 to inform the CPU 20 of the call. The CPU 20 sends a call signal to the handset 8 via the switching circuit 14, the TX 15, the DUP 18, and the antenna 19 like the calling response signal. The CPU 32 in the handset 8 then detects the call signal which is received through the antenna 23, the DUP 24, the RX 28 and the switching circuit 29. The CPU 32 in the handset 8 which has detected the call signal sends a signal to a sounder 34 so that it produces sound. The user of the handset 8 who has heard the sound from the sounder 34 depresses an off-hook button on the keyboard switch 31, whereby a signal is sent to the CPU 32. Like the calling signal, the CPU 32 sends the call response signal to the base unit 7 and, at the same time, controls the sounder 34 to stop the sound. Further, the CPU 32 produces the control signals 602 and 603 that cause the switching circuits 26 and 29 to connect with the microphone 27 and the receiver 30, respectively, such that the communication condition is established. The CPU 20 which has received the call response signal sent to the base unit 7 renders the line relay 11 on and informs the off-hooking to the exchange equipment. Further, the CPU 20 produces the control signals 501 and 503 so that the base unit 7 establishes the speech condition enabling the speech to be carried out between the handset 8 and the telephone set at the other end of the line.

In the handset 8 of the cordless telephone system, when an on-hook button is depressed on the keyboard switch 31, the signal is sent to the CPU 32 and then the CPU 32 sends an on-hook signal to the base unit 7 like the call signal. Upon receipt of the on-hook signal, the CPU 20 of the base unit 7 turns the line relay 11 off and informs the on-hooking to the exchange equipment. Further, the CPU 20 produces the control signals 501 to 503 to cause the TX 15 to cease the transmission operation and to control the switching circuits 14 and 16 to connect with the CPU 20. Thus, the CPU 32 in the handset 8 produces the control signals 601 to 603 to cause the TX 25 to cease the transmission operation and to control the switching circuits 26 and 29 to connect with the CPU 32 so as to be ready for receiving a call.

The charge control operation for the battery 33 in the handset 8 according to the present invention will now be described in conjunction with FIGS. 2(a) and 2(b) and a flow chart of FIG. 3. In the embodiment, it is assumed that the set predetermined time of the timer 6 is selected to be one hour and that after usage for speech communication of one minute, the handset 8 is set back to the base unit 8 (step 302). At the moment, if time elapses more than the time set by the timer 6, that is, if the time longer than one hour has elapsed after the previous detection of $-\Delta V$ (step 303), the quick charge is carried out by the quick charger 1 via the switcher 3 until $-\Delta V$ is detected by the $-\Delta V$ detector 4. This quick charge lasts about five minutes, because the $-\Delta V$ detector 4 needs about five minutes to detect the voltage drop of $-\Delta V$, as mentioned earlier.

Accordingly, the amount of the charge current becomes 49 mAH, $[600 \text{ mA} \times (5/60)] - [60 \text{ mA} \times (1/60)]$. Thereafter, the trickling charge is carried out.

After the charge has been completed, it is assumed that the speech communication is performed for one minute (steps 302 to 309) and, then, the handset is set to the charger (steps 302 and 303). In this case, since the elapse time is within the predetermined time set in the timer 6, the quick charge is not carried out and instead the trickling charge or charge inhibition is carried out (steps 303 to 308). In practice, the discharge amount is 1 mAH. Similarly, the quick charge is never effected within the predetermined time set by the timer 6.

When the predetermined time (one hour) set by the timer 6 has been elapsed, the quick charge is carried out during five minutes and a current amount of about 50 mAH is charged. This charged amount, however, is smaller than one-tenth the fully charged capacity of the battery. Even in the worst case, furthermore, since such quick charge is carried out once an hour, it is not detrimental to the life of the battery and does not cause the charger and the handset to be heated.

In this embodiment, furthermore, the quick charge is not carried out when the handset is set to the charger after speech communication of a period shorter than one hour (e.g., 59 minutes). In this case, the discharge amount is about 60 mAH, and the remaining charge amount in the battery is 88% of the fully charged capacity. Therefore, no disadvantage for system operation is derived from the charge control of the present invention.

Figure 4:
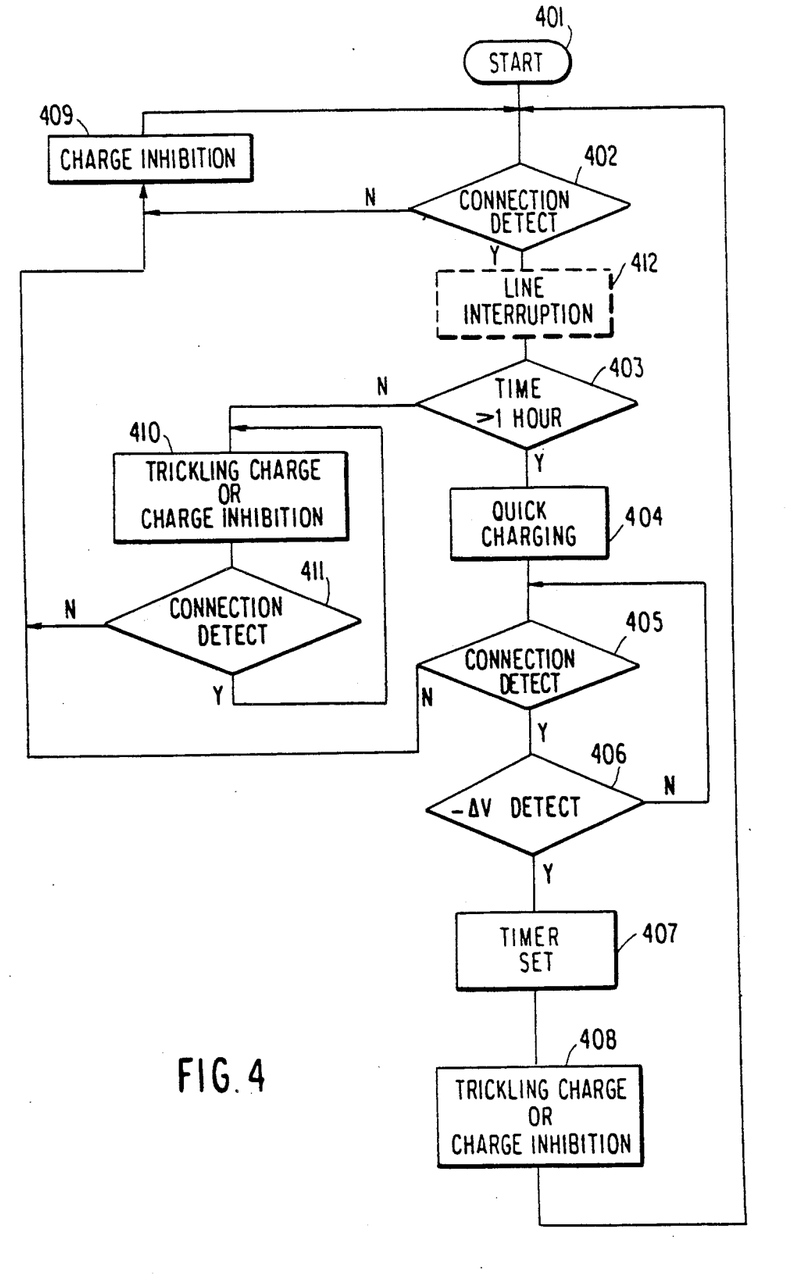
FIG. 4 another flow chart showing the operation of the embodiment of the present invention.

The present invention should not be limited to the above-mentioned charge control. Another charge control can be also possible according to the present invention and FIG. 4 shows a flow chart of another charge control of the present invention. As shown in the flow chart of FIG. 4, the trickling charge is continued even when the time of one hour has passed unless the handset is detached from the base unit. Namely, the quick charge is not carried out until the handset is set again to the base unit after the handset is detached from the base unit. Since a electric current is consumed little by the handset as far as the handset is being set to the base unit, there is no need of quick charge. Therefore, the object of the invention can be accomplished even by such charge control shown in FIG. 4.

Although the above-mentioned embodiments have dealt with the cases where the quick charge is switched to the trickling charge, the invention further encompasses a case where charge inhibition is applied in spite of the trickling charge. Further, the time set by the timer 6 may be varied in accordance with a specification of a system electrically charged.

Figure 3:
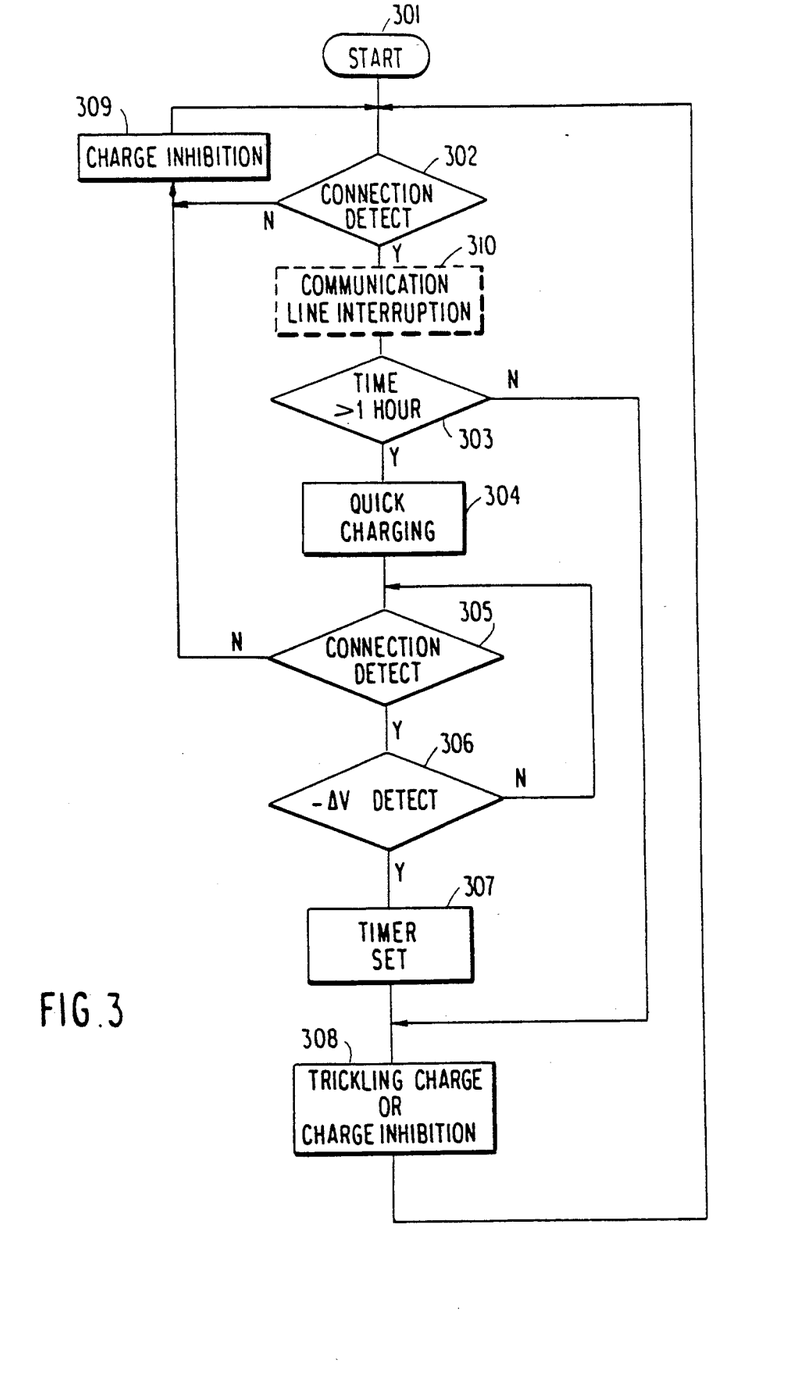
FIG. 3 is a flow chart showing the operation of the embodiment of the present invention.

In the flow charts of FIGS. 3 and 4, other steps (310, 412) for interrupting speech communication in responsive to the detection of connection may be inserted between the steps (302, 402) which detect the connection and the steps (303, 304) which judge elapse of time, respectively. That is, the speech communication is automatically terminated even when the handset is set to the base unit without depressing an on-hook button.

Figure 5:
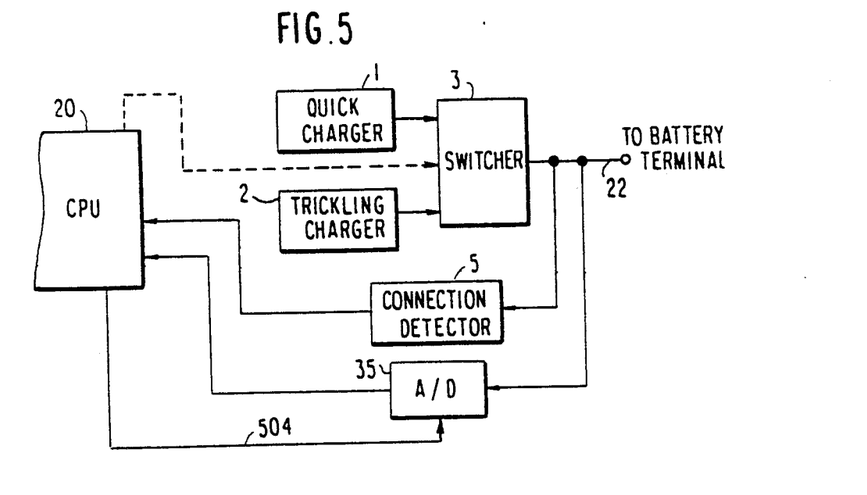
FIG. 5 is a partial block diagram of a base unit illustrating another embodiment according to the present invention.
Figure 6:
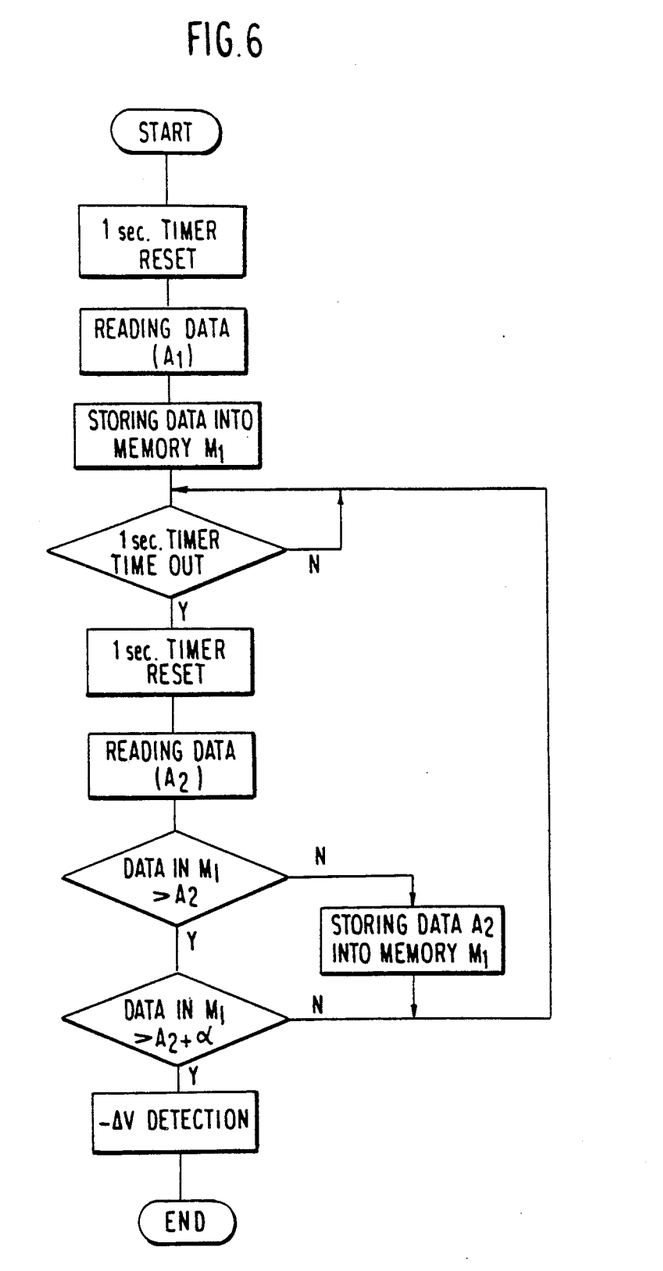
FIG. 6 is a flow chart illustrating the operation of $-\Delta V$ detection in FIG. 5.

FIG. 5 is a partial block diagram of a base unit showing another embodiment according to the present invention. In FIG. 5, $-\Delta V$ detection is performed by data processing of the CPU 20. Therefore, an A/D converter 35 is applied to convert the battery voltage into digital data in response to a control signal 504 and the digital data is supplied to the CPU 20. FIG. 6 shows a flow chart of data processing of the CPU for detecting $\Delta V$ drop In FIG. 6, each of A1 and A2 denotes digital data representing the voltage of the battery; M1, a memory area in the CPU 20; and 2, a digital value corresponding to $-\Delta$.

As described above, according to the present invention, the cordless telephone system, which is capable of preventing over charge of a battery contained in the handset and capable of lengthening the life of the battery, is obtained.

What is claimed is:

1. In a cordless telephone system including of a base unit and a handset, a charge control circuit with which a battery contained in the handset is electrically charged from a charger contained in the base unit when the handset is set to the base unit, said charge control circuit comprising:
   a connection detector for detecting connection between the handset and the base unit;
   a fully charged condition detector for detecting a fully charged condition of said battery;
   timer means for designating a predetermined period of time in response to an output of said fully charged condition detector; and
   control means responsive to the output of said or inhibit said battery from being charged within said predetermined period of time, and to quickly charge said battery after said predetermined period of time has elapsed.

2. A method of controlling charge for a cordless telephone system which includes a base unit having charging means and a handset having a battery to be electrically charged, and in which said battery is electrically charged when said handset is connected to said base unit, said method comprising the following steps of:
   detecting the connection of said handset to said base unit;
   detecting the fully charged condition of said battery;
   determining whether or not a predetermined period of time from the time when said battery is fully charged elapses;
   quickly charging said battery after the elapse of the predetermined period of time from the time when said battery is fully charged; and
   subjecting said battery to trickling charge or to charge-inhibition within the predetermined period of time from the time when said battery is fully charged.

3. A cordless telephone system comprising a base unit and a handset, said base unit including a battery charger and said handset including a battery, said system further comprising:
   means for detecting connection between said base unit and said handset to produce a connection detection signal;
   means for detecting a full-charged state of said battery to generate a full-charged detection signal;
   means for establishing a predetermined period after the generation of said full-charged detection signal; and
   means for controlling the charge of said battery in response to said connection detection signal, wherein, said battery is charged with a first current after said predetermined period elapses and said battery is charged with a second current during said predetermined period said second current being smaller than said first current.

4. A cordless telephone system as claimed in claim 3, said detecting means including:
   an A/D converter for converting an output voltage of said battery into digital data; and a data processor receiving said digital data for detecting a voltage drop of a predetermined value from a maximum voltage of said battery to generate said full-charged detection signal.

5. A charge control circuit for a telephone system including a base unit and a handset, said base unit and handset communicating with each other by a radio frequency in operation, comprising:

a battery disposed in said handset, said battery being electrically charged when said handset is set to said base unit;

quick charge means for quickly charging said battery;

full-charge detector means for detecting a full-charge condition of said battery to produce a full-charge detection signal;

timer means being started in response to said full-charge detection signal for counting a predetermined period of time after said full-charge detection signal is produced; and connection detector means for generating a detection signal when said handset is set to said base unit;

control means coupled to said timer means and said connection detection means for rendering said quick charge means operative in response to said detection signal until said full-charge detector means detects said full-charge condition and for rendering said quick charge means inoperative during said predetermined period of time.

6. A charge control circuit as claimed in claim 6, wherein said circuit further comprises trickle charge means for trickingly charging said battery, and wherein said control means renders said trickle charge means operative in response to said full-charge detect signal.

7. A charge control circuit as claimed in claim 6, wherein said control means renders said trickle charge means operative during said predetermined period of time.

8. A charge control circuit as claimed in claim 6, wherein said battery comprises a rechargeable Nickel Cadmium battery.

9. A charge control circuit as claimed in claim 6, wherein said predetermined period of time is one hour.

10. In a cordless telephone system including a base unit and a handset, a battery being contained in said handset, a charge control circuit comprising:

quick charge means for quickly charging said battery;

full-charge detector means for detecting a full-charge condition of said battery to produce a full-charge detection signal;

connection detector means for detecting a connection between said base unit and said handset to produce a connection detection signal;

timer means started in response to said full-charge detection signal for generating a timer signal after a predetermined period of time, and control means responsive to said timer signal and to said connection detection signal for rendering said quick charge means operative until said full-charge detector means detects said full-charge condition.

* * * * *

UNITED STATES PATENT AND TRADEMARK OFFICE
CERTIFICATE OF CORRECTION

PATENT NO. : 4,992,720

DATED : February 12, 1991

INVENTOR(S) : Mamoru HATA

It is certified that error appears in the above-identified patent and that said Letters Patent is hereby corrected as shown below:

Col. 6, line 20, after "said" insert --timer means for controlling charge operation of said battery in said handset to either tricklingly charge said battery--;

Col. 7, line 29, delete "claim 6" and insert --claim 5--;

Col. 8, line 8, delete "claim 6" and insert --claim 5--;

Col. 8, line 11, delete "claim 6" and insert --claim 5--.

Signed and Sealed this

Twenty-ninth Day of September, 1992

Attest:

DOUGLAS B. COMER

*Attesting Officer*  *Acting Commissioner of Patents and Trademarks*